US009993695B2

(12) United States Patent
Nagasawa et al.

(10) Patent No.: US 9,993,695 B2
(45) Date of Patent: Jun. 12, 2018

(54) GOLF BALL MANUFACTURING METHOD

(71) Applicant: BRIDGESTONE SPORTS CO., LTD., Minato-ku, Tokyo (JP)

(72) Inventors: Hiroyuki Nagasawa, Chichibushi (JP); Katsunobu Mochizuki, Chichibushi (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 772 days.

(21) Appl. No.: 14/503,724

(22) Filed: Oct. 1, 2014

(65) Prior Publication Data

US 2015/0102521 A1    Apr. 16, 2015

(30) Foreign Application Priority Data

Oct. 10, 2013  (JP) .................................. 2013-212786

(51) Int. Cl.
| *A63B 45/00* | (2006.01) |
| *B29C 45/14* | (2006.01) |
| *A63B 37/00* | (2006.01) |
| *B29C 45/00* | (2006.01) |
| *B29K 105/00* | (2006.01) |
| *B29K 75/00* | (2006.01) |
| *B29L 31/54* | (2006.01) |

(52) U.S. Cl.
CPC .......... *A63B 45/00* (2013.01); *A63B 37/0023* (2013.01); *B29C 45/14819* (2013.01); *A63B 37/0075* (2013.01); *A63B 37/0076* (2013.01); *B29C 45/0001* (2013.01); *B29K 2075/00* (2013.01); *B29K 2105/0044* (2013.01); *B29L 2031/546* (2013.01)

(58) Field of Classification Search
None
See application file for complete search history.

(56) References Cited

U.S. PATENT DOCUMENTS

| 5,688,890 | A | * | 11/1997 | Ishiguro ................ C08G 18/24 525/440.08 |
| 6,194,505 | B1 | | 2/2001 | Sone et al. |
| 6,518,389 | B1 | | 2/2003 | Kaufhold et al. |
| 6,642,314 | B2 | | 11/2003 | Sone et al. |
| 6,863,953 | B2 | | 3/2005 | Mori et al. |
| 7,294,680 | B2 | | 11/2007 | Sone et al. |
| 7,910,642 | B2 | | 3/2011 | Maeder et al. |
| 7,999,019 | B2 | | 8/2011 | Nakamura et al. |
| 2006/0009310 | A1 | * | 1/2006 | Melanson .......... A63B 37/0003 473/371 |
| 2006/0249880 | A1 | | 11/2006 | Nagasawa et al. |
| 2009/0143170 | A1 | * | 6/2009 | Ohira .................... A63B 45/00 473/385 |

FOREIGN PATENT DOCUMENTS

| JP | 11-35633 A | 2/1999 |
| JP | 11-164912 A | 6/1999 |
| JP | 2000-178437 A | 6/2000 |
| JP | 2001-303369 A | 10/2001 |
| JP | 2002-293996 A | 10/2002 |
| JP | 2003-166181 A | 6/2003 |
| JP | 2003-238796 A | 8/2003 |
| JP | 2004-182980 A | 7/2004 |
| JP | 2004-346146 A | 12/2004 |
| JP | 2006312043 A | 11/2006 |
| JP | 2007-144097 A | 6/2007 |
| JP | 2007-217678 A | 8/2007 |
| JP | 2008-504422 A | 2/2008 |
| JP | 2009-066241 A | 4/2009 |
| JP | 2011140618 A | 7/2011 |

* cited by examiner

*Primary Examiner* — Matthew Daniels
*Assistant Examiner* — Mohammad M Ameen
(74) *Attorney, Agent, or Firm* — Sughrue Mion, PLLC

(57) ABSTRACT

A method of manufacturing golf balls having a core and a cover of at least one layer encasing the core includes, when molding the cover, blending a thermal antioxidant into the cover stock in a plurality of divided portions. This method is able to minimize deterioration and discoloration of the cover stock, enabling golf balls of stable quality to be obtained. In addition, it is able to facilitate the use of reclaimed material, enabling environmentally and economically efficient production to be carried out.

9 Claims, No Drawings

GOLF BALL MANUFACTURING METHOD

CROSS-REFERENCE TO RELATED APPLICATION

This non-provisional application claims priority under 35 U.S.C. § 119(a) on Patent Application No. 2013-212786 filed in Japan on Oct. 10, 2013, the entire contents of which are hereby incorporated by reference.

TECHNICAL FIELD

The present invention relates to a method of manufacturing golf balls having a core and a cover of one or more layer. The invention relates in particular to a golf ball manufacturing method which is able to minimize discoloration and degeneration of the cover stock due to the action of heat and oxidation during molding of the cover and which, moreover, can facilitate reuse of the cover stock.

BACKGROUND ART

Most golf balls in use today are manufactured by injection molding or compression molding a material composed largely of urethane resin, ionomer resin or the like over a solid core that typically consists primarily of rubber such as a diene rubber.

The above resins generally deteriorate under the action of heat, light, oxygen, mechanical shear forces, ozone, NOx gases and the like, sometimes giving rise to undesirable effects such as a decline in physical properties and a poor appearance due to discoloration. Various types of inhibitors are used to suppress such effects. In particular, thermal antioxidants are used to inhibit deterioration by heat. Such antioxidants include radical scavengers (primary agent) and peroxide decomposers (secondary agent), the primary agent being exemplified by phenolic antioxidants and the secondary agent being exemplified by phosphate antioxidants and sulfur antioxidants.

Polymers typically undergo deterioration when exposed to heat or light or upon contact with oxygen. In particular, ultraviolet light having a wavelength of 400 nm or less possesses a lot of energy and acts directly on polymers, destroying their bonds. Furthermore, in the presence of oxygen, the oxidative deterioration of polymers is also promoted. These actions can generally be suppressed by the addition of ultraviolet absorber and light stabilizer (e.g., hindered amine light stabilizers, abbreviated as HALS) ingredients. By using both in combination, or by additionally using also a thermal antioxidant, synergistic effects can be obtained.

The cost of golf balls can be lowered by mass production, but a large amount of scrap such as runners is generated, in proportion with the production volume, when injection-molding covers and the like. Normally, such scrap is granulated and then reused as reclaimed material by blending the scrap in a predetermined proportion with virgin material. However, because the reclaimed material has already incurred a thermal history from molding and the like, there is a concern that, if blended in too large an amount, it may have a deleterious effect on the appearance and durability of the molded articles. Hence, at present, from the standpoint of maintaining the quality of the molded articles, there is a limit to the amount of reclaimed materials that can be used. It is generally recommended that the amount of such reclaimed material be set to not more than about 23 wt % of the overall molding material (that is, about 30 parts by weight per 100 parts by weight of virgin material). Accordingly, the development of efficient manufacturing methods capable of facilitating the use of reclaimed materials while maintaining the quality of the molded articles is important both from an environmental standpoint and also from an economic standpoint.

Prior-art documents relating to this invention include the following: JP-A 2000-178437, JP-A 2001-303369, JP-A 2003-166181, JP-A 2003-238796, JP-A 2004-182980, JP-A 2004-346146, JP-A 2007-217678, JP-A 2007-144097, JP-A 2008-504422 and JP-A 2009-66241.

CITATION LIST

Patent Document 1: JP-A 2000-178437
Patent Document 2: JP-A 2001-303369
Patent Document 3: JP-A 2003-166181
Patent Document 4: JP-A 2003-238796
Patent Document 5: JP-A 2004-182980
Patent Document 6: JP-A 2004-346146
Patent Document 7: JP-A 2007-217678
Patent Document 8: JP-A 2007-144097
Patent Document 9: JP-A 2008-504422
Patent Document 10: JP-A 2009-66241

SUMMARY OF INVENTION

Technical Problem

It is therefore an object of the invention to provide a method of manufacturing golf balls which is able to minimize cover stock deterioration and discoloration and thus can obtain golf balls of stable quality, and which moreover facilitates the use of reclaimed material, thereby enabling production that is both environmentally and economically efficient.

Solution to Problem

We have discovered that, when preparing a cover stock (virgin material), by compounding therein a thermal antioxidant in a plurality of divided portions, deterioration and discoloration of the material during preparation of the cover stock and molding of the cover can be effectively suppressed, making it possible in particular to minimize deleterious effects on the ball's appearance.

Accordingly, the invention provides a method of manufacturing golf balls having a core and a cover of at least one layer encasing the core, which method includes the steps of, when molding the cover: synthesizing a cover stock base resin, blending and kneading an additive into the base resin to form a cover stock, and molding a cover using the kneaded cover stock. In this golf ball manufacturing method, a thermal antioxidant is included in both the base resin synthesizing step and the kneading step.

Typically, the cover formed in the cover molding step is an outermost layer and the base resin is a thermoplastic polyurethane elastomer, with the thermoplastic polyurethane elastomer preferably being an aromatic polyisocyanate-containing thermoplastic polyurethane elastomer.

Injection molding may be used in the cover molding step.

It is preferable for the amount of thermal antioxidant included in the synthesizing step to be from 0.05 to 3.0 parts by weight per 100 parts by weight of the base resin, and for the amount of thermal antioxidant included in the kneading step to be from 0.05 to 3.0 parts by weight per 100 parts by weight of the base resin.

It is more preferable for the amount of thermal antioxidant included in the synthesizing step to be from 0.1 to 1.0 part by weight per 100 parts by weight of the base resin, and for the amount of thermal antioxidant included in the kneading step to be from 0.1 to 1.0 part by weight per 100 parts by weight of the base resin.

In a preferred aspect of the manufacturing method of the invention, reclaimed material is included as some portion of the cover stock in the cover molding step, the amount of the reclaimed material included being set to from 20 to 50 wt % of the overall cover stock. The amount of the reclaimed material included is more preferably set to from 25 to 45 wt % of the overall cover stock.

Advantageous Effects of Invention

This invention makes it possible, by including a thermal antioxidant in both the synthesizing step and the kneading step, to fully elicit the advantageous effects of the thermal antioxidant. Deterioration and discoloration of the cover stock can thereby be minimized, enabling golf balls of stable quality to be obtained. Moreover, the use of reclaimed material can be facilitated, enabling environmentally and economically efficient production to be carried out.

DESCRIPTION OF EMBODIMENTS

The objects, features and advantages of the invention will become more apparent from the following description.

The golf ball manufacturing method of the invention includes, when molding the cover of a golf ball having a core and a cover of at least one layer encasing the core, the steps of: synthesizing a cover stock base resin; blending and kneading an additive with the base resin thus synthesized to form a cover stock; and molding a cover using the kneaded cover stock. A thermal antioxidant is included in both the base resin synthesizing step and the kneading step. In this invention, by including the thermal antioxidant in both the synthesizing step and the kneading step, the advantageous effects of the thermal antioxidant can be fully elicited, enabling deterioration and discoloration of the material during preparation of the cover stock molding of the cover to be effectively suppressed.

As with conventional golf balls, the construction of the golf balls produced by the manufacturing method of the invention may be suitably set according to the target performance, and is not particularly limited. That is, the balls may be, as appropriate, either two-piece solid golf balls in which a one-layer cover is formed over a solid core, or multi-piece solid golf balls having a structure of three or more pieces in which the above solid core and a cover of at two or more layers have been formed. In cases where the cover is formed of two or more layers, the layer formed on the outermost side is sometimes designated as the "outermost layer," and the layer formed between the core and the outermost layer is sometimes designated as the "intermediate layer." The core is not limited to a single layer, and may be formed of two or more layers. Numerous dimples are typically formed on the surface of the outermost layer so as to enhance the aerodynamic properties of the ball.

First, the synthesizing step is described.

This step synthesizes the base resin to be used in the cover stock. The manufacturing method of the invention is characterized in that a thermal antioxidant is included during synthesis of the base resin. The base resin to be synthesized is exemplified by, but not particularly limited to, thermoplastic elastomers and thermoplastic resins. Illustrative examples of thermoplastic elastomers include polyurethane-type, polyester-type, polyamide-type, olefin-type and styrene-type thermoplastic elastomers. In this invention, a thermoplastic polyurethane elastomer is preferred; an aromatic polyisocyanate-containing thermoplastic polyurethane elastomer is more preferred. Aside from including a predetermined amount of a thermal antioxidant during synthesis, an ordinary method and ordinary conditions may be employed when synthesizing the base resin.

A known thermal antioxidant may be used as the thermal antioxidant. Examples include, but are not limited to, hindered phenol-type thermal antioxidants, amine-type thermal antioxidants, phosphorus-containing thermal antioxidants and sulfur-containing thermal antioxidants. In this invention, of these thermal antioxidants, the use of hindered phenol-type thermal antioxidants is especially preferred. Such thermal antioxidants may be used singly or two or more may be used in combination. The above thermal antioxidants are described below.

Illustrative examples of hindered phenol-type thermal antioxidants include pentaerythritol tetrakis[3-(3,5-di-tert-butyl-4-hydroxy-phenyl)propionate], thiodiethylenebis[3-(3,5-di-tert-butyl-4-hydroxyphenyl)-propionate], octadecyl-3-(3,5-di-tert-butyl-4-hydroxyphenyl)propionate, N,N'-hexane-1,6-diylbis[3-(3,5-di-tert-butyl-4-hydroxyphenyl-propionamide)], 3,5-bis(1,1-dimethylethyl)-4-hydroxy-C7-C9 branched alkyl esters of benzenepropanoic acid, 3,3',3",5,5',5"-hexa-tert-butyl-a,a',a"-(mesitylene-2,4,6-triyl)tri-p-cresol, calcium diethylbis[[[3,5-bis(1,1-dimethylethyl)-4-hydroxyphenyl]methyl]phosphonate], a mixture of calcium diethylbis[[[3,5-bis(1,1-dimethylethyl)-4-hydroxyphenyl]methyl]phosphonate] (50 wt %) and polyethylene wax (50 wt %), 4,6-bis(octylthiomethyl)-o-cresol, 4,6-bis(dodecylthiomethyl)-o-cresol, ethylenebis(oxyethylene)bis[3-(5-tert-butyl-4-hydroxy-m-tolyl)propionate], hexamethylenebis[3-(3,5-di-tert-butyl-4-hydroxyphenyl)-propionate, 1,3,5-tris(3,5-di-tert-butyl-4-hydroxybenzyl)-1,3,5-triazine-2,4,6(1H, 3H, 5H)-trione, 1,3,5-tris[(4-tert-butyl-3-hydroxy-2,6-xylyl)methyl]-1,3,5-triazine-2,4,6(1H,3H,5H)-trione, the reaction product (CAS No.: 68411-46-1) of N-phenylbenzenamine with 2,4,4-trimethylpentene, and 2,6-di-tert-butyl-4-(4,6-bis(octylthio)-1,3,5-triazin-2-ylamino)phenol.

Commercial products may be used as these hindered phenol-type thermal antioxidants. Illustrative examples include IRGANOX 1010, IRGANOX 1035, IRGANOX 1076, IRGANOX 1098, IRGANOX 1135, IRGANOX 1330, IRGANOX 1425 WL, IRGANOX 1520L, IRGANOX 1726, IRGANOX 245, IRGANOX 259, IRGANOX 3114, IRGANOX 3790, IRGANOX 5057 and IRGANOX 565 (available from Ciba Specialty Chemicals).

Phosphorus-containing thermal antioxidants are exemplified by tris(2,4-di-tert-butylphenyl)phosphite. Commercial products of this compound include IRGAFOS 168 (Ciba Specialty Chemicals).

Sulfur-containing thermal antioxidants are exemplified by didodecyl-3,3'-thiodipropionate and dioctadecyl-3,3'-thiodipropionate. Commercial products of these compounds include IRGANOX PS 800 FD and IRGANOX PS 802 FD (Ciba Specialty Chemicals).

The amount of thermal antioxidant included in the synthesizing step, although not particularly limited, may be set to preferably from 0.05 to 3.0 parts by weight, and more preferably from 0.1 to 1.0 part by weight, per 100 parts by weight of the base resin. Including too much thermal antioxidant may lower the physical properties or cause bleedout, or may lead to increased material costs. On the other hand, if too little is included, a sufficient resin oxidization inhibiting effect may not be exhibited.

Next, in the kneading step, various additives, including an additional portion of the thermal antioxidant, are blended into the thermal antioxidant-containing base resin that was obtained in the synthesizing step.

The thermal antioxidant used in the kneading step may be the same as that used in the synthesizing step. The amount included, although not particularly limited, may be set to preferably from 0.05 to 3.0 parts by weight, and more preferably from 0.1 to 1.0 part by weight, per 100 parts by weight of the base resin. Including too much may adversely impact the physical properties or lead to increased material costs. On the other hand, if too little is included, a sufficient resin oxidation inhibiting effect may not be exhibited. By thus blending in thermal antioxidant a plurality of times, the advantageous effects of the thermal antioxidant can be fully elicited, making it possible to avoid having the material incur unnecessary heat excursions.

As used above, "100 parts by weight of the base resin" refers only to the weight of the resin synthesized in the synthesizing step, and does not include the weight of the thermal antioxidant. The same applies below.

In this invention, aside from the above thermal antioxidant, an ultraviolet absorber, a light stabilizer and the like may also be blended in so as to enhance the durability.

Known compounds may be included as the ultraviolet absorber. Although not particularly limited, exemplary ultraviolet absorbers include salicylic acid derivatives, benzophenone-type ultraviolet absorbers, benzotriazole-type ultraviolet absorbers, cyanoacrylate-type ultraviolet absorbers, triazine-type ultraviolet absorbers and nickel complexes. Illustrative examples of salicylic acid derivatives include phenyl salicylate, p-t-butylphenyl salicylate and p-octylphenyl salicylate. Illustrative examples of benzophenone-type ultraviolet absorbers include 2,4-dihydroxybenzophenone, 2-hydroxy-4-methoxybenzophenone, 2-hydroxy-4-octoxybenzophenone and 2,2-dihydroxy-4,4'-methoxybenzophenone.
Illustrative examples of benzotriazole-type ultraviolet absorbers include 2-(2'-hydroxy-5'-methylphenyl)benzotriazole, 2-(2'-hydroxy-5'-t-butylphenyl)benzotriazole, 2-(2-hydroxy-3'-t-butyl-5'-methylphenyl)-5-chlorobenzotriazole, 2-[2-hydroxy-3,5-bis(α,α-dimethylbenzyl)phenyl]-2H-benzotriazole and 2-(5-methyl-2-hydroxyphenyl)benzotriazole. Illustrative examples of cyanoacrylate-type ultraviolet absorbers include 2-ethylhexyl-2-cyano-3,3-diphenylacrylate and ethyl-2-cyano-3,3'-diphenylacrylate.
Illustrative examples of triazine-type ultraviolet absorbers include 2-(4,6-diphenyl-1,3,5-triazin-2-yl)-5[(hexyl)oxy]-phenol, 2,4-bis(2-hydroxy-4-butyloxyphenyl)-6-(2,4-bis-butyloxyphenyl)-1,3,5-triazine and 2-[4-[(2-hydroxy-3-(2'-ethyl)hexyl)oxy]-2-hydroxyphenyl]-4,6-bis(2,4-dimethylphenyl)-1,3,5-triazine. In this invention, from the standpoint of effectively suppressing discoloration of the cover, ultraviolet absorbers which absorb ultraviolet light at wavelengths of 240 to 400 nm are preferred. That is, salicylic acid derivatives, triazine-type ultraviolet absorbers, benzophenone-type ultraviolet absorbers, benzotriazole-type ultraviolet absorbers and cyanoacrylate-type ultraviolet absorbers are preferred, with benzotriazole-type ultraviolet absorbers being especially preferred. These ultraviolet absorbers may be used singly or two or more may be used in combination.

Commercial products may be used as these above ultraviolet absorbers. Examples of commercial benzophenone-type ultraviolet absorbers include Sumisorb 130 and Sumisorb 140 (Sumitomo Chemical Co., Ltd.). Examples of benzotriazole-type ultraviolet absorbers include TINUVIN 234, TINUVIN 900, TINUVIN 326 and TINUVIN P (Ciba Specialty Chemicals). An example of a cyanoacrylate-type ultraviolet absorber is Uvinul N-35 (BASF). Examples of triazine-type ultraviolet absorbers include TINUVIN 1577, TINUVIN 460 and TINUVIN 405 (Ciba Specialty Chemicals).

The amount of the above ultraviolet absorber included is not particularly limited, but may be set to preferably at least 0.05 part by weight, and more preferably at least 0.10 part by weight, per 100 parts by weight of the base resin. There is no particular upper limit in the amount of ultraviolet absorber included, although this may be set to preferably not more than 3.0 parts by weight, and more preferably not more than 1.0 part by weight, per 100 parts by weight of the base resin. Including too much may have an adverse influence on the physical properties or may lead to increased material costs. On the other hand, if too little is included, a sufficient resin deterioration inhibiting effect may not be exhibited.

Known compounds may be used as the light stabilizer. Although not particularly limited, preferred use may be made of hindered amine light stabilizers. A single light stabilizer may be used alone or two or more may be used in combination. Illustrative examples of hindered amine light stabilizers include bis(1,2,2,6,6-pentamethyl-4-piperidyl)[[3,5-bis(1,1-dimethylethyl)-4-hydroxyphenyl]methyl]butyl malonate and 1-[2-[3-(3,5-di-t-butyl-4-hydroxyphenyl)propionyloxy]ethyl]-4-[3-(3,5-di-t-butyl-4-hydroxyphenyl)propionyloxy]-2,2,6,6-tetramethylpiperidine. In this invention, from the standpoint of suppressing discoloration of the cover, preferred use can be made of 1-[2-[3-(3,5-di-t-butyl-4-hydroxyphenyl)propionyloxy]ethyl]-4-[3-(3,5-di-t-butyl-4-hydroxyphenyl)propionyloxy]-2,2,6,6-tetramethylpiperidine.

A commercial product may be used as the hindered amine light stabilizer. Illustrative examples include Sanol LS-2626, TINUVIN 111 FDL, TINUVIN 123 and TINUVIN 144 (Ciba Specialty Chemicals).

The amount of the light stabilizer included, although not particularly limited, may be set to preferably at least 0.05 part by weight, and more preferably at least 0.1 part by weight, per 100 parts by weight of the base resin. There is no particular upper limit, although this amount may be set to preferably not more than 3.0 parts by weight, and more preferably not more than 1.0 part by weight, per 100 parts by weight of the base resin. Including too much may have an adverse influence on the physical properties or may lead to increased material costs. On the other hand, if too little is included, a sufficient resin deterioration inhibiting effect may not be exhibited.

In addition, an inorganic filler such as titanium oxide may be optionally included in the kneading step. The amount in which such an inorganic filler is included, although not particularly limited, may be set to from 0.01 to 5 parts by weight per 100 parts by weight of the base resin.

Various other additives may be optionally included in the kneading step. For example, pigments, dispersants, mold release agents and fillers other than the above may be suitably included.

Aside from the thermal antioxidant-containing base resin synthesized in the synthesizing step, ordinary thermoplastic elastomers and thermoplastic resins may be additionally included without particular limitation in the kneading step. In such a case, these thermoplastic elastomers and thermoplastic resins may, of course, be blended together with the various above additives, or may be used as a binder when masterbatching the various additives. In the practice of the invention, in those cases also where the above thermoplastic elastomers and thermoplastic resins are included in the kneading step, the amounts of the various additives included are set based on the weight of the base resin synthesized in the synthesizing step (which weight does not include the weight of the thermal antioxidant).

Known mixing apparatuses such as a kneading-type single-screw extruder, kneading-type twin-screw extruder, roll mill or Banbury mixer may be used without particular limitation in the kneading step. The processing temperature in this case, although not particularly limited, may be set to preferably from 150 to 250° C., and more preferably from 170 to 230° C.

In the kneading step, the various above additives may be added and blended in directly as is or may be included in a masterbatched form obtained beforehand using a base resin. In cases where these additives are masterbatched, the base resin used as the binder need not necessarily be the same as that synthesized in the synthesizing step.

The cover molding step molds the golf ball cover using the cover stock obtained in the kneading step. A known molding process such as injection molding or compression molding may be used without particular limitation in the cover molding step. The molding temperature is not particularly limited, and may be suitably set in accordance with, for example, the thickness of the cover to be formed and the melt viscosity of the resin. Molding is preferably carried out in a temperature range that does not give rise to thermal deterioration of the resin itself. In the practice of the invention, it is especially preferable to make use of injection molding. In such cases, the molding temperature, though it will vary with, for example such factors as the blending in of material, may be set in the range of generally from 150 to 250° C. Here, "molding temperature" refers to the temperature setting of the heating cylinder in the injection molding machine.

In the cover molding step, pellets of the cover stock that has been kneaded in the kneading step are charged into the injection molding machine. At this time, if necessary, other additives may be separately charged simultaneous with charging of these pellets. However, in such a case, given the need to pay attention to the kneadability within the cylinder of the molding machine and the fact that external equipment such as a metering mixer for the additives is separately required, it is more preferable in this invention for pellets containing all the ingredients needed in the cover stock to be produced in the kneading step.

As used herein, "cover" refers to a layer formed over the solid core, and includes the cover (outermost layer) in a two-piece solid golf ball, and both the intermediate layer (a layer other than the outermost layer) and the outermost layer in a multi-piece solid golf ball having a cover of two or more layers. The manufacturing method of the invention may also be applied in cases where any of these layers is molded, although it can most preferably be employed in cases where the cover of a two-piece solid golf ball or the outermost layer of a multi-piece solid golf ball is formed.

In cases where multi-piece solid golf balls are produced, the cover stock in which thermal antioxidant has been included in the synthesizing step and the kneading step may be used to mold one of the layers, or such cover stocks of the same or differing formulations may be used in two or more layers.

In the cover molding step, granulated scrap from runners and the like generated in molding can be reused as reclaimed material. When reclaimed material is included as a portion of the cover stock, the amount included, although not particularly limited, may be set to preferably from 20 to 50 wt %, and more preferably from 25 to 45 wt %, of the overall cover stock. If too much reclaimed material is included, this may adversely impact the physical properties and appearance of the ball. In general, it is recommended that the amount in which such reclaimed material is included be set to not more than about 23 wt % of the overall cover stock (this corresponds to about 30 parts by weight per 100 parts by weight of virgin material). However, in this invention, deterioration and discoloration of the material is effectively suppressed in each step—that is, the base resin synthesizing step, the cover stock kneading step and the cover molding step; hence, deterioration and discoloration of the scrap generated during molding is limited. What this means is that by employing the manufacturing method of the invention, a larger amount of reclaimed material can be included, making it possible to increase the efficiency in the use of reclaimed material. Moreover, reuse a number of times is possible.

In the practice of the invention, when a thermoplastic polyurethane elastomer is used as the base resin in the cover stock, the following Polyurethane Material (I) or Polyurethane Material (II) may be advantageously used. These materials are described in detail below.

Polyurethane Material (I)

This material (I) is composed primarily of components A and B below:

(A) a thermoplastic polyurethane material,
(B) an isocyanate mixture obtained by dispersing (b-1) an isocyanate compound having as functional groups at least two isocyanate groups per molecule in (b-2) a thermoplastic resin that is substantially non-reactive with isocyanate.

When the cover is formed with this material (I), a golf ball having a better feel, controllability, cut resistance, scuff resistance and durability to cracking on repeated impact can be obtained.

Next, each of above components is described.

The thermoplastic polyurethane material (A) has a structure which includes soft segments composed of a polymeric polyol (polymeric glycol), and hard segments composed of a chain extender and a polyisocyanate. Here, the polymeric polyol used as a starting material may be any that has hitherto been used in the art relating to thermoplastic polyurethane materials, and is not subject to any particular limitation. However, in this invention, preferred use may be made of polyester polyols and polyether polyols.

Illustrative examples of polyester polyols include adipate polyols such as polyethylene adipate glycol, polypropylene adipate glycol, polybutadiene adipate glycol and polyhexamethylene adipate glycol, and lactone polyols such as polycaprolactone polyol. Illustrative examples of polyether polyols include poly(ethylene glycol), poly(propylene glycol) and poly(tetramethylene glycol).

The chain extender employed is preferably one that has hitherto been used in the art relating to thermoplastic polyurethanes, but is not subject to any particular limitation. In the present invention, use may be made of low-molecular-weight compounds with a molecular weight of 2,000 or less and having on the molecule at least two active hydrogen atoms capable of reacting with isocyanate groups. Of these, the use of aliphatic diols having from 2 to 12 carbons is preferred. Illustrative examples include 1,4-butylene glycol, 1,2-ethylene glycol, 1,3-butanediol, 1,6-hexanediol and 2,2-dimethyl-1,3-propanediol. The use of 1,4-butylene glycol is especially preferred.

The polyisocyanate compound is not subject to any particular limitation; preferred use may be made of one that has hitherto been used in the art relating to thermoplastic polyurethanes. Illustrative examples include one or more selected from the group consisting of 4,4'-diphenylmethane diisocyanate, 2,4-toluene diisocyanate, 2,6-toluene diisocyanate, p-phenylene diisocyanate, xylylene diisocyanate, 1,5-naphthylene diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. Depending on the type of isocyanate used, the crosslinking reaction during injection molding may be difficult to control. In the practice of the invention, to provide a balance between stability at the time of production and the physical properties that are manifested, it is most preferable to use 4,4'-diphenylmethane diisocyanate, which is an aromatic diisocyanate.

A commercial product may be suitably used as the thermoplastic polyurethane material composed of the above-described material. Illustrative examples include those manufactured by DIC Bayer Polymer, Ltd. under the trade name Pandex, and those manufactured by Dainichiseika Color & Chemicals Mfg. Co., Ltd. under the trade name Resamine.

The isocyanate mixture (B) is obtained by dispersing (b-1) an isocyanate compound having as functional groups at least two isocyanate groups per molecule in (b-2) a thermoplastic resin that is substantially non-reactive with isocyanate. Here, the isocyanate compound (b-1) is preferably one that is known to the art. Examples include, but are not limited to, aromatic diisocyanates such as 4,4'-diphenylmethane diisocyanate, 2,4-toluene diisocyanate and 2,6-toluene diisocyanate; and aliphatic diisocyanates such as hexamethylene diisocyanate. From the standpoint of reactivity and safety of the operations, the use of 4,4'-diphenylmethane diisocyanate is most preferred.

The thermoplastic resin (b-2) is preferably a resin having a low water absorption and excellent compatibility with thermoplastic polyurethane materials. Illustrative examples of such resins include polystyrene resins, polyvinyl chloride resins, ABS resins, polycarbonate resins, and polyester elastomers (e.g., polyether-ester block copolymers, polyester-ester block copolymers). From the standpoint of rebound resilience and strength, the use of a polyester elastomer, particularly a polyether-ester block copolymer, is especially preferred.

In the isocyanate mixture (B), it is desirable for the compounding ratio of the thermoplastic resin (b-2) to the isocyanate compound (b-1), expressed as the weight ratio (b-2):(b-1), to be within a range of from 100:5 to 100:100, and especially from 100:10 to 100:40. If the amount of the isocyanate compound (b-1) included relative to the thermoplastic resin (b-2) is too small, a greater amount of the isocyanate mixture (B) will have to be added to achieve an amount of addition sufficient for the crosslinking reaction with the thermoplastic polyurethane material (A). As a result, the thermoplastic resin (b-2) will exert a large effect, rendering inadequate the physical properties of the material. On the other hand, if the amount of the isocyanate compound (b-1) relative to the thermoplastic resin (b-2) is too large, the isocyanate compound (b-1) may cause slippage to occur during mixing, making preparation of the isocyanate mixture (B) difficult.

The isocyanate mixture (B) can be obtained by, for example, adding the isocyanate compound (b-1) to the thermoplastic resin (b-2) and thoroughly working together these components at a temperature of from 130 to 250° C. using a roll mill or a Banbury mixer, then either pelletizing or cooling and subsequently grinding. A commercial product such as Crossnate EM30 (Dainichiseika Color & Chemicals Mfg. Co., Ltd.) may be suitably used as the isocyanate mixture (B).

Polyurethane material (I) is composed primarily of such a thermoplastic polyurethane material (A) and isocyanate mixture (B). In this polyurethane material (I), the isocyanate mixture (B) may be included in an amount, per 100 parts by weight of the thermoplastic polyurethane material (A), of at least 1 part by weight, preferably at least 5 parts by weight, and more preferably at least 10 parts by weight. The upper limit in the amount included may be set to 100 parts by weight or less, preferably 50 parts by weight or less, and more preferably 30 parts by weight or less. If too little isocyanate mixture (B) is included relative to the thermoplastic polyurethane material (A), a sufficient crosslinking effect is not achieved. On the other hand, if too much is included, the unreacted isocyanate discolors the molded material, which is undesirable.

In addition to the above-described components A and B, another component (C), although not essential, may also be included in polyurethane material (I). For example, thermoplastic polymeric materials other than thermoplastic polyurethane materials may be included; illustrative examples include polyester elastomers, polyamide elastomers, ionomeric resins, styrene block elastomers, polyethylenes and nylon resins. When such a component C is included, the amount included is selected as appropriate for such purposes as adjusting the hardness, improving the resilience, improving the flow properties, and improving the adhesion of the cover stock. Although not subject to any particular limitation, this amount may be set to preferably at least 10 parts by weight per 100 parts by weight of component A. The upper limit in the amount included, although not subject to any particular limitation, may be set to 100 parts by weight or less, preferably 75 parts by weight or less, and more preferably 50 parts by weight or less, per 100 parts by weight of component A.

In the practice of the invention, when preparing the above polyurethane material (I), a thermal antioxidant and, optionally, various additives such as ultraviolet absorbers, light stabilizers, dispersants and mold release agents may be included in the synthesizing step. Also, along with including additional thermal antioxidant, various additives such as pigments, dispersants, mold release agents, fillers and thermoplastic polymer materials other than thermoplastic polyurethane materials may be suitably included in the kneading step.

A known molding method may be employed to mold the cover using the above polyurethane material (I). For example, use may be made of a method that involves adding the isocyanate mixture (B) to the thermoplastic polyurethane material (A) and dry mixing, then feeding the resulting mixture to an injection molding machine and injecting the molten resin composition over the golf ball core. The molding temperature will vary according to the type of thermoplastic polyurethane material (A), but is generally in the range of 150 to 250° C.

Reactions and crosslinking which take place in the golf ball cover obtained as described above are thought to involve the reaction of isocyanate groups with hydroxyl groups remaining in the thermoplastic polyurethane material to form urethane bonds, reactions involving the addition of isocyanate groups to urethane groups on the thermoplastic polyurethane material, leading to the creation of an allophanate crosslinked structure or, in the presence of moisture, the creation of urea bonds and a biuret crosslinked structure. In this case, the crosslinking reaction has not yet proceeded to a sufficient degree immediately after injection molding of polyurethane material (I), but the crosslinking reaction can be made to proceed further by carrying out an annealing step after molding, in this way conferring the golf ball cover with useful characteristics. "Annealing," as used herein, refers to heat aging the cover at a constant temperature for a fixed length of time, or aging the cover for a fixed period at room temperature.

Polyurethane Material (II)

This material (II) is a single resin blend in which the primary components are (D) a thermoplastic polyurethane and (E) a polyisocyanate compound. By forming a cover composed primarily of such a polyurethane material (II), it is possible to achieve an excellent feel, controllability, cut resistance, scuff resistance and durability to cracking on repeated impact without a loss of resilience.

In this specification, reference to a "single" resin blend means that the cover is molded by feeding the resin blend not as a plurality of types of pellets, but rather by supplying the resin blend to an injection molding machine or the like as one type of pellet in which a plurality of ingredients have been incorporated into the individual pellets.

To fully and effectively achieve the objects of the invention, a necessary and sufficient amount of unreacted isocyanate groups should be present within the cover resin material. Specifically, it is recommended that the combined weight of above components D and E account for at least 60%, and preferably at least 70%, of the total weight of the cover. Components D and E are described in detail below.

The above thermoplastic polyurethane elastomer (D) is the base resin of Polyurethane Material (II). The structure includes soft segments made of a polymeric polyol (polymeric glycol) that is a long-chain polyol, and hard segments made of a chain extender and a polyisocyanate compound. Here, the long-chain polyol used as a starting material is not subject to any particular limitation, and may be any that has hitherto been used in the art relating to thermoplastic polyurethanes. Exemplary long-chain polyols include polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. These long-chain polyols may be used singly or as combinations of two or more thereof.

Illustrative examples of polyester polyols that may be used include adipate polyols such as polyethylene adipate glycol, polypropylene adipate glycol, polybutadiene adipate glycol and polyhexamethylene adipate glycol, and lactone polyols such as polycaprolactone polyol.

Illustrative examples of polyether polyols include poly (ethylene glycol), poly(propylene glycol), poly(tetramethylene glycol) and poly(methyltetramethylene glycol) obtained by the ring-opening polymerization of cyclic ethers. These polyether polyols may be used singly or as a combination of two or more thereof.

It is preferable for these long-chain polyols to have a number-average molecular weight in the range of 600 to 5,000. By using a long-chain polyol having a number-average molecular weight within this range, golf balls made with a thermoplastic polyurethane composition having excellent properties such as resilience and manufacturability can be reliably obtained. The number-average molecular weight of the long-chain polyol is more preferably in the range of 800 to 4,000, and even more preferably in the range of 1,000 to 3,000.

As used herein, "number-average molecular weight" refers to the number-average molecular weight calculated based on the hydroxyl number measured in accordance with JIS K-1557 (the same applies below).

Any chain extender that has hitherto been employed in the art relating to thermoplastic polyurethanes may be advantageously used as the chain extender. For example, low-molecular-weight compounds with a molecular weight of 1,000 or less which have on the molecule two or more active hydrogen atoms capable of reacting with isocyanate groups are preferred. Illustrative, non-limiting, examples of the chain extender include 1,4-butylene glycol, 1,2-ethylene glycol, 1,3-butanediol, 1,6-hexanediol and 2,2-dimethyl-1, 3-propanediol. Of these, an aliphatic diol having 2 to 12 carbons is preferred, and 1,4-butylene glycol is more preferred, as the chain extender.

Any polyisocyanate compound hitherto employed in the art relating to thermoplastic polyurethanes may be advantageously used without particular limitation as the polyisocyanate compound. For example, use may be made of one or more selected from the group consisting of 4,4'-diphenylmethane diisocyanate, 2,4-toluene diisocyanate, 2,6-toluene diisocyanate, p-phenylene diisocyanate, xylylene diisocyanate, 1,5-naphthylene diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. However, depending on the type of isocyanate, the crosslinking reaction during injection molding may be difficult to control. In the practice of the invention, to provide a balance between stability at the time of production and the properties that are manifested, it is most preferable to use 4,4'-diphenylmethane diisocyanate, which is an aromatic diisocyanate.

It is most preferable for the thermoplastic polyurethane serving as above component D to be a thermoplastic polyurethane synthesized using a polyether polyol as the long-chain polyol, using an aliphatic diol as the chain extender, and using an aromatic diisocyanate as the polyisocyanate compound. It is desirable, though not essential, for the polyether polyol to be polytetramethylene glycol having a number-average molecular weight of at least 1,000, for the chain extender to be 1,4-butylene glycol, and for the aromatic isocyanate compound to be 4,4'-diphenylmethane diisocyanate.

The compounding ratio of active hydrogen atoms to isocyanate groups in the above polyurethane-forming reaction may be adjusted within a desirable range so as to make it possible to obtain a golf ball which is composed of a thermoplastic polyurethane composition and has various improved properties, such as rebound, spin performance, scuff resistance and manufacturability. Specifically, in preparing a thermoplastic polyurethane by reacting the above long-chain polyol, polyisocyanate compound and chain extender, it is desirable to use the respective components in proportions such that the amount of isocyanate groups on the polyisocyanate compound per mole of active hydrogen atoms on the long-chain polyol and the chain extender is from 0.95 to 1.05 moles.

No particular limitation is imposed on the method of preparing the thermoplastic polyurethane serving as component D. Production may be carried out by either a prepolymer process or a one-shot process in which a known urethane-forming reaction is carried out using the long-chain polyol, chain extender and polyisocyanate compound. Of these, a process in which melt polymerization is carried out in a substantially solvent-free state is preferred. Production by continuous melt polymerization using a multiple screw extruder or a single-screw extruder is especially preferred.

Next, concerning the polyisocyanate compound used as component E, it is essential that, in at least some portion thereof within the single resin blend, all the isocyanate groups on the molecule remain in an unreacted state. That is, polyisocyanate compound in which all the isocyanate groups on the molecule are in a completely free state should be present within the single resin blend, and such a polyisocyanate compound may be present together with a polyisocyanate compound in which some of the isocyanate groups on the molecule are in a free state.

Various isocyanates may be used without particular limitation as the polyisocyanate compound. Illustrative examples include one or more selected from the group consisting of 4,4'-diphenylmethane diisocyanate, 2,4-toluene diisocyanate, 2,6-toluene diisocyanate, p-phenylene diisocyanate, xylylene diisocyanate, 1,5-naphthylene diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. Of the above group of isocyanates, using 4,4'-diphenylmethane diisocyanate, dicyclohexylmethane diisocyanate and isophorone diisocyanate is preferred for achieving a good balance between the influence on moldability by, for example, the rise in viscosity accompanying reaction with component D, and the properties of the resulting golf ball cover stock.

In the cover of the inventive golf ball, although not an essential ingredient, a thermoplastic elastomer other than the above thermoplastic polyurethane elastomers may be included as component F in addition to above components D and E. Including this component F in the above resin blend enables the flow properties of the resin blend to be further improved and enables various properties required of a golf ball cover stock, such as resilience and scuff resistance, to be enhanced.

This component F, which is a thermoplastic elastomer other than the above thermoplastic polyurethane elastomers, is exemplified by one or more thermoplastic elastomer selected from among polyester elastomers, polyamide elastomers, ionomeric resins, styrene block elastomers, hydrogenated styrene-butadiene rubbers, styrene-ethylene/butylene-ethylene block copolymers and modified forms thereof, ethylene-ethylene/butylene-ethylene block copolymers and modified forms thereof, styrene-ethylene/butylene-styrene block copolymers and modified forms thereof, ABS resins, polyacetals, polyethylenes and nylon resins. The use of polyester elastomers, polyamide elastomers and polyacetals is especially preferred because the resilience and scuff resistance are enhanced, owing to reactions with isocyanate groups, while at the same time a good manufacturability is retained.

The relative proportions of above components D, E and F are not subject to any particular limitation. However, to fully achieve the advantageous effects of the invention, it is preferable for the weight ratio among the respective components to be (D):(E):(F)=100:2 to 50:0 to 50, and more preferably (D):(E):(F)=100:2 to 30:8 to 50.

In this invention, a cover-forming resin blend is prepared by mixing together component D, component E, and also optional component F. At this time, it is essential to select the mixing conditions such that, of the polyisocyanate compound, at least some polyisocyanate compound is present in which all the isocyanate groups on the molecule remain in an unreacted state. For example, treatment such as mixture in an inert gas (e.g., nitrogen) or in a vacuum state must be furnished. The resin blend is then injection-molded over a core which has been placed in a mold. In order to smoothly and easily handle the resin blend, it is preferable for the blend to be formed into pellets having a length of 1 to 10 mm and a diameter of 0.5 to 5 mm. Sufficient isocyanate groups in an unreacted state remain in these resin pellets; the unreacted isocyanate groups react with component D or component F to form a crosslinked material while the resin blend is being injection-molded over the core, or due to post-treatment such as annealing thereafter.

When preparing Polyurethane Material (II) in this invention, a thermal antioxidant and, optionally, additives such as ultraviolet absorbers, light stabilizers, dispersants and mold release agents are blended into component D in the synthesizing step. In the subsequent kneading step, component E, optional component F, and also thermal antioxidant are added and blended in, along with which various optional additives such as pigments, dispersants, mold release agents and fillers are also suitably blended in.

The melt mass flow rate at 210° C. of this resin blend is not subject to any particular limitation. However, to increase the flow properties and manufacturability, the melt flow rate is preferably at least 5 g/10 min, and more preferably at least 6 g/10 min. If the melt mass flow rate of the resin blend is too small, the flow properties will decrease, which may cause eccentricity during injection molding and may also lower the degree of freedom in the thickness of the cover that can be molded. The melt mass flow rate is a measured value obtained in accordance with JIS K-7210 (1999 edition).

An example of a method which may be employed to mold the cover using the cover stock involves feeding the above-described resin blend to an injection-molding machine, and injecting the molten resin blend over the core. The molding temperature in this case varies depending on the type of thermoplastic polyurethane, but is generally in the range of 150 to 250° C.

When injection molding is carried out, it is desirable, though not essential, to subject some or all of the resin paths from the resin feed zone to the mold interior to purging with an inert gas such as nitrogen or a low-moisture gas such as low dew-point dry air, or to vacuum treatment, and thereby carry out molding in a low-humidity environment. Preferred, non-limiting, examples of the medium used for transporting the resin under applied pressure include low-moisture gases such as low dew-point dry air or nitrogen gas. By carrying out molding in such a low-humidity environment, reactions by the isocyanate groups are kept from proceeding before the resin is charged into the mold interior. As a result, polyisocyanate in a form where some isocyanate groups are present in an unreacted state is included within the molded resin material, thus making it possible to reduce variable factors such as an undesirable rise in viscosity and to increase the real crosslinking efficiency.

Techniques that may be used to confirm the presence of polyisocyanate compound in an unreacted state within the resin blend prior to injection molding over the core include those which involve extraction with a suitable solvent that selectively dissolves out only the polyisocyanate compound. An example of a simple and convenient method is one in which confirmation is carried out by simultaneous thermogravimetric and differential thermal analysis (TG-DTA) measurement in an inert atmosphere. For example, when the resin blend (cover stock) used in this invention is heated in a nitrogen atmosphere at a temperature ramp-up rate of 10° C./min, a gradual drop in the weight of diphenylmethane diisocyanate can be observed from about 150° C. On the other hand, in a resin sample in which the reaction between the thermoplastic polyurethane material and the isocyanate mixture has been carried out to completion, a weight drop is not observed from about 150° C., but a weight drop can be observed from about 230 to 240° C.

After the resin blend has been molded as described above, the properties as a golf ball cover can be additionally improved by carrying out annealing so as to induce the crosslinking reactions to proceed further. "Annealing," as used herein, refers to aging the cover in a fixed environment for a fixed length of time.

When producing a multi-piece solid golf ball having a cover of two or more layers by the manufacturing method of the invention, one or more of the layers may be formed using conventional materials composed primarily of resin materials that are thermoplastic resins or thermoplastic elastomers, such as known ionomeric resins or polyurethanes. These conventional materials may be used in any layer of the multi-piece solid golf ball, although use in forming the intermediate layer of the golf ball is especially preferred. Concerning these conventional materials, depending on the ball specifications and other considerations, the same or different such materials may be used in two or more layers. The method of molding such a layer from a conventional material is not particularly limited, although a known method such as injection molding may be suitably selected for this purpose. It should be noted that such a layer is not formed in cases where the cover encasing the core is composed of a single layer.

In golf balls obtained by the manufacturing method of the invention, the thickness of the cover, although not particularly limited, is preferably set in the range of 0.3 to 3.0 mm. As noted above, the golf ball cover is not limited to one layer and may be formed as a multilayer structure of two or more layers. When formed as a multilayer structure, the overall thickness of the cover is preferably set within the above range.

Also, although not particularly limited, to increase adhesion between an intermediate layer formed of the above conventional material and a cover stock in which a thermal antioxidant has been included in the synthesizing step and the kneading step (especially in cases where a thermoplastic polyurethane elastomer has been used as the base resin), it is desirable to abrade the surface of the intermediate layer prior to forming the cover. In addition, adhesion can be further enhanced by applying a primer (adhesive) to the surface of the intermediate layer following such abrasion treatment or by adding a known adhesion reinforcing agent to the intermediate layer-forming material (conventional material). Examples of adhesion reinforcing agents that may be incorporated in the material include organic compounds such as 1,3-butanediol and trimethylolpropane, and oligomers such as polyethylene glycol and polyhydroxy polyolefin oligomers. The use of trimethylolpropane or a polyhydroxy polyolefin oligomer is especially preferred. Illustrative examples of commercially available products include trimethylolpropane produced by Mitsubishi Gas Chemical Co., Ltd. and polyhydroxy polyolefin oligomers produced by Mitsubishi Chemical Corporation (under the trade name designation Polytail H; number of main-chain carbons, 150 to 200; with hydroxyl groups at the ends).

In the practice of the invention, the solid core may be formed using a known rubber composition, and is not subject to any particular limitation. Preferred examples include rubber compositions formulated as shown below.

A material composed primarily of rubber may be used as the material that forms the core. For example, the core may be formed of a rubber composition containing, in addition to the base rubber: a co-crosslinking agent, an organic peroxide, an inert filler, sulfur, an antioxidant, an organosulfur compound and the like.

Polybutadiene is preferably used as the base rubber of the rubber composition. It is desirable for this polybutadiene to have a cis-1,4 bond content on the polymer chain of at least 60 wt %, preferably at least 80 wt %, more preferably at least 90 wt %, and most preferably at least 95 wt %. Too low a cis-1,4 bond content among the bonds on the molecule may result in a lower rebound. Moreover, the polybutadiene has a 1,2-vinyl bond content on the polymer chain of preferably not more than 2 wt %, more preferably not more than 1.7 wt %, and even more preferably not more than 1.5 wt %. Too high a 1,2-vinyl bond content may lower the rebound.

To obtain a molded and vulcanized rubber composition having a good resilience, the polybutadiene used in the invention is preferably one synthesized with a rare-earth catalyst or a Group VIII metal compound catalyst. Polybutadiene synthesized with a rare-earth catalyst is especially preferred.

Such rare-earth catalysts are not subject to any particular limitation. Exemplary rare-earth catalysts include those made up of a combination of a lanthanide series rare-earth compound with an organoaluminum compound, an alumoxane, a halogen-bearing compound and an optional Lewis base.

Examples of suitable lanthanide series rare-earth compounds include halides, carboxylates, alcoholates, thioalcoholates and amides of atomic number 57 to 71 metals.

In the practice of the invention, the use of a neodymium catalyst in which a neodymium compound serves as the lanthanide series rare-earth compound is particularly advantageous because it enables a polybutadiene rubber having a high cis-1,4 bond content and a low 1,2-vinyl bond content to be obtained at an excellent polymerization activity. Suitable examples of such rare-earth catalysts include those mentioned in JP-A 11-35633, JP-A 11-164912 and JP-A 2002-293996.

To increase the rebound, it is preferable for the polybutadiene synthesized using the lanthanide series rare-earth compound catalyst to account for at least 10 wt %, preferably at least 20 wt %, and more preferably at least 40 wt %, of the rubber components.

Rubber components other than the above-described polybutadiene may be included in the rubber composition, insofar as the objects of the invention are attainable. Illustrative examples of rubber components other than the above-described polybutadiene include other polybutadienes, and other diene rubbers, such as styrene-butadiene rubber, natural rubber, isoprene rubber and ethylene-propylene-diene rubber.

Examples of co-crosslinking agents include unsaturated carboxylic acids and the metal salts of unsaturated carboxylic acids.

Specific examples of unsaturated carboxylic acids include acrylic acid, methacrylic acid, maleic acid and fumaric acid. Acrylic acid and methacrylic acid are especially preferred.

The metal salts of unsaturated carboxylic acids, while not subject to any particular limitation, are exemplified by the above-mentioned unsaturated carboxylic acids neutralized with desired metal ions. Specific examples include the zinc and magnesium salts of methacrylic acid and acrylic acid. The use of zinc acrylate is especially preferred.

The unsaturated carboxylic acid and/or metal salt thereof is included in an amount, per 100 parts by weight of the base rubber, which is preferably at least 5 parts by weight, more preferably at least 10 parts by weight, and even more preferably at least 15 parts by weight. The amount included is preferably not more than 60 parts by weight, more preferably not more than 50 parts by weight, even more preferably not more than 40 parts by weight, and most preferably not more than 30 parts by weight. Too much may make the core too hard, giving the ball an unpleasant feel at impact, whereas too little may lower the rebound.

The organic peroxide may be a commercially available product, suitable examples of which include Percumyl D (available from NOF Corporation), Perhexa 3M (NOF Corporation), Perhexa C40 (NOF Corporation) and Luperco 231XL (Atochem Co.). The use of one of these alone is preferred.

The amount of organic peroxide included per 100 parts by weight of the base rubber is preferably at least 0.1 part by weight, more preferably at least 0.3 part by weight, even more preferably at least 0.5 part by weight, and most preferably at least 0.7 part by weight. The upper limit in the amount included is preferably not more than 5 parts by weight, more preferably not more than 4 parts by weight, even more preferably not more than 3 parts by weight, and most preferably not more than 2 parts by weight. Too much or too little organic peroxide may make it impossible to achieve a ball having a good feel, durability and rebound.

Examples of suitable inert fillers include zinc oxide, barium sulfate and calcium carbonate. These may be used singly or as a combination of two or more thereof.

The amount of inert filler included per 100 parts by weight of the base rubber is preferably at least 1 part by weight, and more preferably at least 5 parts by weight. The upper limit in the amount included is preferably not more than 100 parts by weight, more preferably not more than 80 parts by weight, and even more preferably not more than 60 parts by weight. Too much or too little inert filler may make it impossible to achieve a proper weight and a good rebound.

In addition, an antioxidant may be included if necessary. Illustrative examples of suitable commercial antioxidants include Nocrac NS-6, Nocrac NS-30 and Nocrac 200 (all available from Ouchi Shinko Chemical Industry Co., Ltd.), and Yoshinox 425 (available from Yoshitomi Pharmaceutical Industries, Ltd.). These may be used singly or as a combination of two or more thereof.

The amount of antioxidant included can be set to more than 0, and may be set to an amount per 100 parts by weight of the base rubber which is preferably at least 0.05 part by weight, and more preferably at least 0.1 part by weight. The maximum amount included, although not subject to any particular limitation, may be set to an amount per 100 parts by weight of the base rubber which is preferably not more than 3 parts by weight, more preferably not more than 2 parts by weight, even more preferably not more than 1 part by weight, and most preferably not more than 0.5 part by weight. Too much or too little antioxidant may make it impossible to achieve a suitable core hardness gradient, a good rebound and durability, and a spin rate-lowering effect on full shots.

In the practice of the invention, an organosulfur compound may be optionally included with the base rubber in order to enhance the core rebound. In cases where an organosulfur compound is included, the content thereof per 100 parts by weight of the base rubber may be set to preferably at least 0.05 part by weight, more preferably at least 0.1 part by weight, and even more preferably at least 0.2 part by weight. The upper limit in the amount of organosulfur compound included is preferably not more than 5 parts by weight, more preferably not more than 4 parts by weight, and even more preferably not more than 2 parts by weight. Including too little organosulfur compound may make it impossible to obtain a sufficient core rebound-increasing effect. On the other hand, if too much is included, the core hardness may become too low, worsening the feel of the ball on impact, and the durability of the ball to cracking when repeatedly struck may worsen.

The rubber composition containing the various above ingredients is prepared by mixture using a typical intensive mixing apparatus, such as a Banbury mixer or a roll mill. When this rubber composition is used to mold the core, molding may be carried out by compression molding or injection molding using a specific mold for molding cores. The resulting molded body is then heated and cured under temperature conditions sufficient for the organic peroxide and co-crosslinking agent included in the rubber composition to act, thereby giving a core having a specific hardness profile. The vulcanization conditions in this case, while not subject to any particular limitation, are generally set to conditions of about 130 to 170° C., and especially 150 to 160° C., for 10 to 40 minutes, and especially 12 to 20 minutes.

The core diameter, although not subject to any particular limitation, may be set to from 30 to 40 mm. In this case, the lower limit is preferably at least 32 mm, more preferably at least 34 mm, and even more preferably at least 35 mm. The upper limit may be set to preferably not more than 39 mm, and more preferably not more than 38 mm.

The deflection of the core when compressed under a final load of 1,275 N (130 kgf) from an initial load of 98 N (10 kgf), although not subject to any particular limitation, may be set within the range of 2.0 to 6.0 mm. The lower limit is preferably at least 2.5 m, more preferably at least 3.0 mm, and even more preferably at least 3.5 mm. The upper limit is preferably not more than 5.5 mm, and more preferably not more than 5.0 mm. If the core is harder than the above range (smaller deflection), when the ball is struck at a high head speed, a sufficient distance-reducing effect may not be obtained. On the other hand, if the core is softer than the above range (larger deflection), the feel at impact may become too soft and the ball may have a poor durability to cracking when repeatedly struck.

In this invention, by using the above-described material to form the solid core, an increased rebound can be achieved, thus making it possible to provide a golf ball which is capable of obtaining a stable trajectory.

The above core is not limited to a single-layer construction, and may instead have a multilayer construction of two or more layers. By giving the core a multilayer construction, the spin rate on shots with a driver can be reduced, enabling a further increase in distance to be achieved. Moreover, the spin properties and feel of the ball when struck can be further enhanced. In such cases, the core has at least an inner core layer (inner sphere) and an outer core layer.

Numerous dimples are typically formed on the surface of the golf ball obtained by forming the various above layers. In addition, a clear coat and markings may be applied to the surface of the cover.

In golf balls produced by the manufacturing method of the invention, the shapes, number and arrangement of the dimples formed on the surface may be suitably set according to the ball specifications, and are not subject to any particular limitations. For example, the dimple shapes may be suitably selected from among not only circular shapes, but also non-circular polygonal shapes, dewdrop shapes and oval shapes. The diameter of the above dimples, although not particularly limited, is preferably set in the range of 0.5 to 6 mm. In addition, the dimple depth, although not particularly limited, is preferably set in the range of 0.05 to 0.4 mm.

No particular limitation is imposed on the surface coverage by the dimples on the surface of the ball. However, from the standpoint of the aerodynamic properties, the surface coverage is preferably set to at least 70%, more preferably at least 75%, and even more preferably at least 80%.

The ball has a deflection when compressed under a final load of 1,275 N (130 kgf) from an initial load of 98 N (10 kgf) which, although not particularly limited, may be set to preferably at least 2.5 mm. The maximum deflection, although not particularly limited, may be set to preferably not more than 7 mm.

Golf balls produced by the manufacturing method of the invention can be made to conform to the Rules of Golf for competitive play. Specifically, the balls can be formed to a diameter which is not less than 42.67 mm and to a weight which is not more than 45.93 g.

Examples

The manufacturing method of the invention is illustrated more fully below by way of Examples involving the production of three-piece solid golf balls having a core about which a two-layer cover consisting of an intermediate layer and an outermost layer has been formed, although the invention is not limited by the following Examples.

First, solid cores having a diameter of 37.6 mm were produced by preparing in the usual manner a core-forming rubber composition formulated as shown in Table 1, then vulcanizing this composition at 157° C. for 15 minutes.

TABLE 1

|  |  | Core |
|---|---|---|
| Formulation (parts by weight) | Polybutadiene rubber | 100 |
|  | Sulfur | 0.1 |
|  | Zinc acrylate | 40 |
|  | Organic peroxide | 3.0 |
|  | Zinc oxide | 19.2 |
|  | Zinc salt of pentachlorothiophenol | 1.5 |
|  | Zinc stearate | 5.0 |

Details on the ingredients shown in Table 1 are given below.
Polybutadiene rubber: Available under the trade name "BR730" from JSR Corporation
Organic peroxide: Dicumyl peroxide, available under the trade name "Percumyl D" from NOF Corporation Next, an intermediate layer having a thickness of 1.7 mm was formed by injection-molding, over the resulting core, a material formulated as shown in Table 2.

TABLE 2

|  |  | Intermediate layer |
|---|---|---|
| Formulation (parts by weight) | Himilan 1605 | 50 |
|  | Himilan 1706 | 35 |
|  | Himilan 1557 | 15 |
|  | Trimethylolpropane | 1.0 |

Details on the ingredients shown in Table 2 are given below.
Himilan 1605, 1706, 1557: Ionomer resins available from DuPont-Mitsui Polychemicals Co., Ltd.

Next, an outermost layer was formed by injection-molding cover stocks formulated as shown in Tables 3 to 9 over the intermediate layer formed as described above. The cover stocks used here were prepared by the following method.
Synthesizing Step Thermoplastic polyurethane elastomers TPU-1 and TPU-2 containing 0.3 part by weight of thermal antioxidant per 100 parts by weight of base resin were each synthesized by blending the thermal antioxidant together with the resin starting materials during synthesis. Here, TPU-1 is a thermoplastic polyurethane elastomer having a polymer composition which corresponds to Pandex T8283 (DIC Bayer Polymer, Ltd.), and TPU-2 is a thermoplastic polyurethane elastomer having a polymer composition which corresponds to Pandex T8290 (DIC Bayer Polymer, Ltd.). The base resins obtained as described above were each in the form of pellets having a length of 3 mm and a diameter of 1 to 2 mm.
Kneading Step The above base resins and Starting Materials 2 to 8 formulated as shown in Tables 3 to 9 were charged into a screw-type extruder and kneaded under a nitrogen gas atmosphere, giving cover stocks (these cover stocks are called virgin materials, and refer here to materials for forming the outermost layer) in the form of pellets having a length of 3 mm and a diameter of 1 to 2 mm.
Cover Molding Step The cover stock (virgin material) obtained above was optionally blended with reclaimed material from this cover stock in the proportions shown in Tables 3 to 9 and injection-molded, over the intermediate layer formed as described above, to form an outermost layer, thereby producing a three-piece solid golf ball having an intermediate layer and an outermost layer over the core. The pelletized cover stock (virgin material) and reclaimed material obtained as described above were handled in a low-humidity environment until they were fed to the cover molding step. Moreover, during injection molding, the material transport paths were also rendered into a low-humidity environment. Simultaneous with molding of the cover, an identical arrangement of dimples was formed on the surface of the cover in all of the golf balls produced.

The advantageous effects of the manufacturing method of the invention were verified by producing golf balls in accordance with the above-described method while varying certain conditions, i.e., the amount of reclaimed material included, the number of times reclaimed material is recycled, the amount of thermal antioxidant included and the molding temperature, then evaluating the following properties. The results are shown in Tables 3 to 9.
Ball Deflection:

The ball was placed on a hard plate and the deflection (mm) of the ball when subjected to a final load of 1,275 N (130 kgf) from an initial load state of 98 N (10 kgf) was measured.

Yellowness Index (YI) and Degree of Yellowing (ΔYI):

The ball color after topcoating was measured using a color difference meter (model SC-P, manufactured by Suga Test Instruments Co., Ltd.) according to JIS Z 8722: "Method of Measuring a Reflecting Object" (diffuse illumination, receiving optics with 8° viewing angle: Condition c), with d/8 geometry (measured while excluding specularly reflected component from sample with a light trap). The measurement area diameter used was 30 mm.

In those cases where the degree of yellowing (ΔYI) based on the yellowness index (YI) in the Lab color system and the ball yellowness index (YI) for just the virgin material (compounding ratio of reclaimed material: 0) in the respective Tables 3 to 9 was less than 1, the yellowing resistance was rated as excellent.

1. Amount of Reclaimed Material Included Relative to Virgin Material (Recycling Efficiency)

First, No. 1 golf balls were produced using a cover stock that was 100 wt % virgin material, after which the following No. 2 and No. 3 golf balls were produced and the effects of including different amounts of reclaimed material in the cover stock were investigated.

No. 2: Covers were molded using cover stock containing, based on the overall cover stock, 25.9 wt % of reclaimed material obtained by granulating runners generated during the molding of covers for the No. 1 golf balls (this corresponds to 35 parts by weight of reclaimed material per 100 parts by weight of virgin material).

No. 3: Covers were molded using cover stock containing, based on the overall cover stock, 41.2 wt % of reclaimed material obtained by granulating runners generated during the molding of covers for the No. 1 golf balls (this corresponds to 70 parts by weight of reclaimed material per 100 parts by weight of virgin material).

Next, No. 4 golf balls were produced using a cover stock that was 100 wt % virgin material and was prepared by including a different amount of thermal antioxidant in the kneading step, after which the following No. 5 and No. 6 golf balls were produced and the effects of including different amounts of reclaimed material in the core stock were investigated.

No. 5: Covers were molded using cover stock containing, based on the overall cover stock, 25.9 wt % of reclaimed material obtained by granulating runners generated during the molding of covers for the No. 4 golf balls (this corresponds to 35 parts by weight of reclaimed material per 100 parts by weight of virgin material).

No. 6: Covers were molded using cover stock containing, based on the overall cover stock, 41.2 wt % of reclaimed material obtained by granulating runners generated during the molding of covers for the No. 4 golf balls (this corresponds to 70 parts by weight of reclaimed material per 100 parts by weight of virgin material).

Although it is generally recommended that the amount in which the above reclaimed material is included be set to up to about 23 wt % of the overall cover stock (that is, about 30 parts by weight per 100 parts by weight of the virgin material), it was confirmed from the results in Table 3 that, in the manufacturing method of the invention, discoloration does not readily occur even when a still larger amount of reclaimed material is included. Therefore, it was confirmed that, by employing the manufacturing method of the invention, golf balls of stable quality can be obtained even when a large amount of reclaimed material is included. That is, the manufacturing method of the invention was demonstrated to be capable of re-using more material than conventional methods and thus to provide for excellent recyclability. Moreover, it was possible to confirm that, by increasing the amount of thermal antioxidant included in the kneading step, the yellowness index decreases and the resistance to discoloration is enhanced.

TABLE 3

| | | | No. 1 | No. 2 | No. 3 | No. 4 | No. 5 | No. 6 |
|---|---|---|---|---|---|---|---|---|
| Formulation (pbw) | 1. Base resin | TPU-1 *1 | 25 | 25 | 25 | 25 | 25 | 25 |
| | | TPU-2 *1 | 75 | 75 | 75 | 75 | 75 | 75 |
| | | Thermal antioxidant *2 | 0.3 | 0.3 | 0.3 | 0.3 | 0.3 | 0.3 |
| | 2. Polyisocyanate compound | | 9 | 9 | 9 | 9 | 9 | 9 |
| | 3. Thermoplastic elastomer | | 15 | 15 | 15 | 15 | 15 | 15 |
| | 4. Titanium oxide | | 3.5 | 3.5 | 3.5 | 3.5 | 3.5 | 3.5 |
| | 5. Polyethylene wax | | 1.5 | 1.5 | 1.5 | 1.5 | 1.5 | 1.5 |
| | 6. Ultraviolet absorber | | 0.2 | 0.2 | 0.2 | 0.2 | 0.2 | 0.2 |
| | 7. Hindered amine light stabilizer | | 0.1 | 0.1 | 0.1 | 0.1 | 0.1 | 0.1 |
| | 8. Thermal antioxidant | | 0.2 | 0.2 | 0.2 | 0.5 | 0.5 | 0.5 |
| Reclaimed material compounding ratio (weight ratio) | Virgin material | | 100 | 100 | 100 | 100 | 100 | 100 |
| | Reclaimed material | | 0 | 35 | 70 | 0 | 35 | 70 |
| Amount of reclaimed material included (wt %) | | | 0 | 25.9 | 41.2 | 0 | 25.9 | 41.2 |
| Results | Molding temperature (° C.) | | 225 | 225 | 225 | 225 | 225 | 225 |
| | Diameter (mm) | | 42.7 | 42.7 | 42.7 | 42.7 | 42.7 | 42.7 |
| | Weight (g) | | 45.5 | 45.5 | 45.5 | 45.5 | 45.5 | 45.5 |
| | Deflection (mm) | | 2.3 | 2.3 | 2.3 | 2.3 | 2.3 | 2.3 |
| | Yellowness index (YI) | | −19.4 | −19.0 | −18.7 | −19.4 | −19.3 | −19.0 |
| | Degree of yellowing (ΔYI) | | — | 0.4 | 0.7 | — | 0.1 | 0.4 |

*1: Amount of resin alone containing no thermal antioxidant.
*2: Total amount of thermal antioxidant included when synthesizing TPU-1 and TPU-2.

Details on the starting materials shown in Table 3 are given below.

TPU-1: An aromatic isocyanate polyether-type thermoplastic polyurethane elastomer into which a thermal antioxidant was blended during synthesis, from DIC Bayer Polymer, Ltd. (the polymer composition corresponds to Pandex T8283); Shore A hardness, 83

TPU-2: An aromatic isocyanate polyether-type thermoplastic polyurethane elastomer into which a thermal antioxidant was blended during synthesis, from DIC Bayer Polymer, Ltd. (the polymer composition corresponds to Pandex T8290); Shore A hardness, 93

Thermal antioxidant: Pentaerythritol tetrakis[3-(3,5-di-tert-butyl-4-hydroxyphenyl)propionate] (IRGANOX 1010, from BASF)

Polyisocyanate compound: 4,4-diphenylmethane diisocyanate

Thermoplastic elastomer: Thermoplastic polyether ester elastomer (Hytrel 4001, from DuPont-Toray Co., Ltd.)

Polyethylene wax: Sanwax 161P, from Sanyo Chemical Industries, Ltd.

Ultraviolet absorber: TINUVIN P, from BASF

Hindered amine light stabilizer: TINUVIN 144, from BASF

Details on the various starting materials shown in Table 3 are the same in Tables 4 to 9 below as well. The above Shore A hardnesses are hardnesses measured in accordance with JIS K 6253 (using a type A durometer).

2. Repeated Use

Next, an investigation was conducted on cases in which No. 7 golf balls were produced using a cover stock that was 100 wt % virgin material, after which the cover stock was repeatedly used in the production of the No. 8 to 10 golf balls below. The results are shown in Table 4.

No. 8: Covers were molded using cover stock containing, based on the overall cover stock, 41.2 wt % of reclaimed material obtained by granulating runners generated during the molding of covers for the No. 7 golf balls (this corresponds to 70 parts by weight of reclaimed material per 100 parts by weight of virgin material).

No. 9: Covers were molded using cover stock containing, based on the overall cover stock, 41.2 wt % of reclaimed material obtained by granulating runners generated during the molding of covers for the No. 8 golf balls (this corresponds to 70 parts by weight of reclaimed material per 100 parts by weight of virgin material).

No. 10: Covers were molded using cover stock containing, based on the overall cover stock, 41.2 wt % of reclaimed material obtained by granulating runners generated during the molding of covers for the No. 9 golf balls (this corresponds to 70 parts by weight of reclaimed material per 100 parts by weight of virgin material).

TABLE 4

| | | | No. 7 | No. 8 | No. 9 | No. 10 |
|---|---|---|---|---|---|---|
| Formulation (pbw) | 1. Base resin | TPU-1 *1 | 25 | 25 | 25 | 25 |
| | | TPU-2 *1 | 75 | 75 | 75 | 75 |
| | | Thermal *2 antioxidant | 0.3 | 0.3 | 0.3 | 0.3 |
| | 2. Polyisocyanate compound | | 9 | 9 | 9 | 9 |
| | 3. Thermoplastic elastomer | | 15 | 15 | 15 | 15 |
| | 4. Titanium oxide | | 3.5 | 3.5 | 3.5 | 3.5 |
| | 5. Polyethylene wax | | 1.5 | 1.5 | 1.5 | 1.5 |
| | 6. Ultraviolet absorber | | 0.2 | 0.2 | 0.2 | 0.2 |
| | 7. Hindered amine light stabilizer | | 0.1 | 0.1 | 0.1 | 0.1 |
| | 8. Thermal antioxidant | | 0.3 | 0.3 | 0.3 | 0.3 |

TABLE 4-continued

| | | No. 7 | No. 8 | No. 9 | No. 10 |
|---|---|---|---|---|---|
| Reclaimed material compounding ratio (weight ratio) | Virgin material | 100 | 100 | 100 | 100 |
| | Reclaimed material | 0 | 70 | 70 | 70 |
| Amount of reclaimed material included (wt %) | | 0 | 41.2 | 41.2 | 41.2 |
| Results | Molding temperature (° C.) | 225 | 225 | 225 | 225 |
| | Diameter (mm) | 42.7 | 42.7 | 42.7 | 42.7 |
| | Weight (g) | 45.5 | 45.5 | 45.5 | 45.5 |
| | Deflection (mm) | 2.3 | 2.3 | 2.3 | 2.3 |
| | Yellowness index (YI) | −20.0 | −19.4 | −19.4 | −19.4 |
| | Degree of yellowing (ΔYI) | — | 0.6 | 0.6 | 0.6 |

*1: Amount of resin alone containing no thermal antioxidant.

*2: Total amount of thermal antioxidant included when synthesizing TPU-1 and TPU-2.

From the results in Table 4, it was confirmed that, even in cases where the content of reclaimed material was set to more than 40 wt % and the material was repeatedly used, the degree of yellowing (ΔYI) was 0.6 and discoloration did not readily arise regardless of the number of uses. It was thus confirmed that, by employing the manufacturing method of the invention, golf balls of stable quality can be obtained even when the cover stock is repeatedly used.

3. Content of Thermal Antioxidant

Cover stocks were prepared in which the amounts of thermal antioxidant included in the synthesizing step and the kneading step were varied, and the ensuing effects were investigated. The results are shown in Table 5.

Here, the No. 11, 13 and 15 golf balls were balls in which the covers were molded using cover stocks of 100 wt % virgin material formulated as shown Table 5, and the No. 12, 14 and 16 golf balls were balls in which the covers were molded using reclaimed materials. The details are presented below.

No. 12: Covers were molded using cover stock containing, based on the overall cover stock, 41.2 wt % of reclaimed material obtained by granulating runners generated during the molding of covers for the No. 11 golf balls (this corresponds to 70 parts by weight of reclaimed material per 100 parts by weight of virgin material).

No. 14: Covers were molded using cover stock containing, based on the overall cover stock, 41.2 wt % of reclaimed material obtained by granulating runners generated during the molding of covers for the No. 13 golf balls (this corresponds to 70 parts by weight of reclaimed material per 100 parts by weight of virgin material).

No. 16: Covers were molded using cover stock containing, based on the overall cover stock, 41.2 wt % of reclaimed material obtained by granulating runners generated during the molding of covers for the No. 15 golf balls (this corresponds to 70 parts by weight of reclaimed material per 100 parts by weight of virgin material).

TABLE 5

| | | | \multicolumn{6}{c}{No.} |
|---|---|---|---|---|---|---|---|---|
| | | | 11 | 12 | 13 | 14 | 15 | 16 |
| Formulation (pbw) | 1. Base resin | TPU-1 *1 | 25 | 25 | 25 | 25 | 25 | 25 |
| | | TPU-2 *1 | 75 | 75 | 75 | 75 | 75 | 75 |
| | | Thermal *2 antioxidant | 0.1 | 0.1 | 0.8 | 0.8 | 0.3 | 0.3 |
| | 2. Polyisocyanate compound | | 9 | 9 | 9 | 9 | 9 | 9 |
| | 3. Thermoplastic elastomer | | 15 | 15 | 15 | 15 | 15 | 15 |
| | 4. Titanium oxide | | 3.5 | 3.5 | 3.5 | 3.5 | 3.5 | 3.5 |
| | 5. Polyethylene wax | | 1.5 | 1.5 | 1.5 | 1.5 | 1.5 | 1.5 |
| | 6. Ultraviolet absorber | | 0.2 | 0.2 | 0.2 | 0.2 | 0.2 | 0.2 |
| | 7. Hindered amine light stabilizer | | 0.1 | 0.1 | 0.1 | 0.1 | 0.1 | 0.1 |
| | 8. Thermal antioxidant | | 0.5 | 0.5 | 0.2 | 0.2 | 1.0 | 1.0 |
| Reclaimed material compounding ratio (weight ratio) | Virgin material | | 100 | 100 | 100 | 100 | 100 | 100 |
| | Reclaimed material | | 0 | 70 | 0 | 70 | 0 | 70 |
| Amount of reclaimed material included (wt %) | | | 0 | 41.2 | 0 | 41.2 | 0 | 41.2 |
| Results | Molding temperature (° C.) | | 225 | 225 | 225 | 225 | 225 | 225 |
| | Diameter (mm) | | 42.7 | 42.7 | 42.7 | 42.7 | 42.7 | 42.7 |
| | Weight (g) | | 45.5 | 45.5 | 45.5 | 45.5 | 45.5 | 45.5 |
| | Deflection (mm) | | 2.3 | 2.3 | 2.3 | 2.3 | 2.3 | 2.3 |
| | Yellowness index (YI) | | −18.2 | −17.3 | −20.6 | −20.0 | −21.3 | −20.9 |
| | Degree of yellowing (ΔYI) | | — | 0.9 | — | 0.6 | — | 0.4 |

*1: Amount of resin alone containing no thermal antioxidant.
*2: Total amount of thermal antioxidant included when synthesizing TPU-1 and TPU-2.

It is apparent from the results in Table 5 that each of the materials had an excellent resistance to discoloration. However, it is also clear that some difference in discoloration resistance arises depending on the amount of thermal antioxidant included in the synthesizing step and the amount of thermal antioxidant included in the kneading step. Once a material has become discolored, it does not return to its original state. Hence, it is important to take the influence of heat in each step into account when selecting the suitable amount of thermal antioxidant to be included.

4. Comparative Experiment 1

A comparative experiment with respect to the above No. 1 to 10 golf balls was carried out in which covers were molded using cover stocks prepared without including a thermal antioxidant in the kneading step, and the effects of the amount of reclaimed material included (Nos. 17 to 19) and repeated use (Nos. 17 and 19 to 21) were investigated. In addition, the effects in cases where the cover was molded from cover stock containing 100 wt % of reclaimed material (Nos. 22 and 23) were also investigated. The results are shown in Table 6.

Details on the golf balls produced are as follows.

No. 17: Covers were molded using cover stock containing 100 parts by weight of virgin material prepared without including thermal antioxidant in the kneading step. Aside from not including thermal antioxidant in the kneading step, these golf balls were identical to the No. 1 golf balls.

No. 18: Covers were molded using cover stock containing, based on the overall cover stock, 25.9 wt % of reclaimed material obtained by granulating runners generated during the molding of covers for the No. 17 golf balls (this corresponds to 35 parts by weight of reclaimed material per 100 parts by weight of virgin material).

No. 19: Covers were molded using cover stock containing, based on the overall cover stock, 41.2 wt % of reclaimed material obtained by granulating runners generated during the molding of covers for the No. 17 golf balls (this corresponds to 70 parts by weight of reclaimed material per 100 parts by weight of virgin material).

No. 20: Covers were molded using cover stock containing, based on the overall cover stock, 41.2 wt % of reclaimed material obtained by granulating runners generated during the molding of covers for the No. 19 golf balls (this corresponds to 70 parts by weight of reclaimed material per 100 parts by weight of virgin material).

No. 21: Covers were molded using cover stock containing, based on the overall cover stock, 41.2 wt % of reclaimed material obtained by granulating runners generated during the molding of covers for the No. 20 golf balls (this corresponds to 70 parts by weight of reclaimed material per 100 parts by weight of virgin material).

No. 22: Covers were molded using cover stock containing 100 parts by weight of reclaimed material obtained by granulating runners generated during the molding of covers for the No. 17 golf balls.

No. 23: Covers were molded using cover stock containing 100 parts by weight of reclaimed material obtained by granulating runners generated during the molding of covers for the No. 7 golf balls.

TABLE 6

|  |  |  | No. 17 | No. 18 | No. 19 | No. 20 | No. 21 | No. 22 | No. 23 |
|---|---|---|---|---|---|---|---|---|---|
| Formulation (pbw) | 1. Base resin | TPU-1 *1 | 25 | 25 | 25 | 25 | 25 | 25 | 25 |
|  |  | TPU-2 *1 | 75 | 75 | 75 | 75 | 75 | 75 | 75 |
|  |  | Thermal antioxidant *2 | 0.3 | 0.3 | 0.3 | 0.3 | 0.3 | 0.3 | 0.3 |
|  | 2. Polyisocyanate compound | | 9 | 9 | 9 | 9 | 9 | 9 | 9 |
|  | 3. Thermoplastic elastomer | | 15 | 15 | 15 | 15 | 15 | 15 | 15 |
|  | 4. Titanium oxide | | 3.5 | 3.5 | 3.5 | 3.5 | 3.5 | 3.5 | 3.5 |
|  | 5. Polyethylene wax | | 1.5 | 1.5 | 1.5 | 1.5 | 1.5 | 1.5 | 1.5 |
|  | 6. Ultraviolet absorber | | 0.2 | 0.2 | 0.2 | 0.2 | 0.2 | 0.2 | 0.2 |
|  | 7. Hindered amine light stabilizer | | 0.1 | 0.1 | 0.1 | 0.1 | 0.1 | 0.1 | 0.1 |
|  | 8. Thermal antioxidant | | 0 | 0 | 0 | 0 | 0 | 0 | 0.3 |
| Reclaimed material compounding ratio (weight ratio) | Virgin material | | 100 | 100 | 100 | 100 | 100 | 0 | 0 |
|  | Reclaimed material | | 0 | 35 | 70 | 70 | 70 | 100 | 100 |
| Amount of reclaimed material included (wt %) | | | 0 | 25.9 | 41.2 | 41.2 | 41.2 | 100 | 100 |
| Results | Molding temperature (° C.) | | 225 | 225 | 225 | 225 | 225 | 225 | 225 |
|  | Diameter (mm) | | 42.7 | 42.7 | 42.7 | 42.7 | 42.7 | 42.7 | 42.7 |
|  | Weight (g) | | 45.5 | 45.5 | 45.5 | 45.5 | 45.5 | 45.5 | 45.5 |
|  | Deflection (mm) | | 2.3 | 2.3 | 2.3 | 2.3 | 2.3 | 2.3 | 2.3 |
|  | Yellowness index (YI) | | −19.2 | −18.1 | −17.9 | −17.6 | −17.3 | −16.4 | −17.4 |
|  | Degree of yellowing (ΔYI) | | — | 1.1 | 1.3 | 1.6 | 1.9 | 2.8 | 1.8 |

*1: Amount of resin alone containing no thermal antioxidant.
*2: Total amount of thermal antioxidant included when synthesizing TPU-1 and TPU-2.

The following was confirmed from the results in Table 6.

First, cases in which the amount of reclaimed material included was increased (Nos. 17 to 19), when compared with cases in which the compounding ratio of reclaimed material was the same but thermal antioxidant was blended in a plurality of times (Nos. 1 to 3), showed an increased degree of yellowing and were thus more prone to discoloration.

Next, cases in which the material was repeatedly used (Nos. 17 and 19 to 21), when compared with cases in which the thermal antioxidant was blended in a plurality of times (Nos. 7 to 10), were clearly more prone to discoloration. In particular, in Nos. 7 to 10, the degree of yellowing was substantially constant within a range of up to three repeated uses, whereas in Nos. 17 and 19 to 21, the degree of yellowing rose with each increase in the number of repeated uses.

In cases where the cover was molded with cover stock composed entirely (100 wt %) of reclaimed material (Nos. 22 and 23), although the No. 23 balls in which thermal antioxidant was included in the kneading step had a good resistance to discoloration relative to the No. 22 balls, both had degrees of yellowing (ΔYI) greater than 1.

5. Comparative Experiment 2

As a comparative experiment with respect to the No. 1 and 17 golf balls, golf ball production was carried out in which covers were molded using cover stocks prepared by including a large amount of thermal antioxidant in the synthesizing step and including no thermal antioxidant in the kneading step. The results are shown in Table 7.

TABLE 7

|  |  |  | No. 24 | No. 25 |
|---|---|---|---|---|
| Formulation (pbw) | 1. Base resin | TPU-1 *1 | 25 | 25 |
|  |  | TPU-2 *1 | 75 | 75 |
|  |  | Thermal antioxidant *2 | 1.2 | 1.2 |
|  | 2. Polyisocyanate compound | | 9 | 9 |
|  | 3. Thermoplastic elastomer | | 15 | 15 |
|  | 4. Titanium oxide | | 3.5 | 3.5 |
|  | 5. Polyethylene wax | | 1.5 | 1.5 |
|  | 6. Ultraviolet absorber | | 0.2 | 0.2 |
|  | 7. Hindered amine light stabilizer | | 0.1 | 0.1 |
|  | 8. Thermal antioxidant | | 0 | 0 |
| Reclaimed material compounding ratio (weight ratio) | Virgin material | | 100 | 100 |
|  | Reclaimed material | | 0 | 70 |
| Amount of reclaimed material included (wt %) | | | 0 | 41.2 |
| Results | Molding temperature (° C.) | | 225 | 225 |
|  | Diameter (mm) | | 42.7 | 42.7 |
|  | Weight (g) | | 45.5 | 45.5 |
|  | Deflection (mm) | | 2.3 | 2.3 |
|  | Yellowness index (YI) | | −20.6 | −19.4 |
|  | Degree of yellowing (ΔYI) | | — | 1.2 |

*1: Amount of resin alone containing no thermal antioxidant.
*2: Total amount of thermal antioxidant included when synthesizing TPU-1 and TPU-2.

From the results in Table 7, it was confirmed that even when a large amount of thermal antioxidant is included in the synthesizing step, if no thermal antioxidant is included in the kneading step, the desired discoloration resistance cannot be obtained, making the material unsuitable for reuse.

6. Molding Temperature

The molding temperature in the cover molding step was varied, and the difference in temperature was confirmed to exert an influence on productivity. The results are shown in Tables 8 and 9. Here, the No. 26 to 29 golf balls were produced using cover stocks prepared by including a thermal antioxidant in the synthesizing step and including no thermal antioxidant in the kneading step. The No. 30 to 34 golf balls were produced using cover stocks prepared by including thermal antioxidant in both the synthesizing step and the kneading step.

TABLE 8

| | | | No. | | | |
|---|---|---|---|---|---|---|
| | | | 26 | 27 | 28 | 29 |
| Formulation (pbw) | 1. Base resin | TPU-1 *1 | 35 | 35 | 35 | 35 |
| | | TPU-2 *1 | 65 | 65 | 65 | 65 |
| | | Thermal *2 antioxidant | 0.3 | 0.3 | 0.3 | 0.3 |
| | 2. Polyisocyanate compound | | 9 | 9 | 9 | 9 |
| | 3. Thermoplastic elastomer | | 15 | 15 | 15 | 15 |
| | 4. Titanium oxide | | 3.5 | 3.5 | 3.5 | 3.5 |
| | 5. Polyethylene wax | | 1.5 | 1.5 | 1.5 | 1.5 |
| | 6. Ultraviolet absorber | | 0.2 | 0.2 | 0.2 | 0.2 |
| | 7. Hindered amine light stabilizer | | 0.1 | 0.1 | 0.1 | 0.1 |
| | 8. Thermal antioxidant | | 0 | 0 | 0 | 0 |
| Reclaimed material compounding ratio (weight ratio) | Virgin material | | 100 | 100 | 100 | 100 |
| | Reclaimed material | | 0 | 0 | 0 | 0 |
| Amount of reclaimed material included (wt %) | | | 0 | 0 | 0 | 0 |
| Results | Molding temperature (° C.) | | 220 | 225 | 230 | 235 |
| | Diameter (mm) | | 42.6 | 42.7 | 42.7 | molding was not possible |
| | Weight (g) | | 45.4 | 45.5 | 45.5 | |
| | Deflection (mm) | | 2.4 | 2.4 | 2.4 | |
| | Yellowness index (YI) | | −18.9 | −18.7 | −18.3 | |
| | Degree of yellowing (ΔYI) | | — | 0.2 | 0.6 | |

*1: Amount of resin alone containing no thermal antioxidant.
*2: Total amount of thermal antioxidant included when synthesizing TPU-1 and TPU-2.

From the results in Table 8, when the molding temperature was set to 235° C. or more, problems such as runner breakup (failure) occurred, which interfered with molding.

TABLE 9

| | | | No. | | | | |
|---|---|---|---|---|---|---|---|
| | | | 30 | 31 | 32 | 33 | 34 |
| Formulation (pbw) | 1. Base resin | TPU-1 *1 | 35 | 35 | 35 | 35 | 35 |
| | | TPU-2 *1 | 65 | 65 | 65 | 65 | 65 |
| | | Thermal *2 antioxidant | 0.3 | 0.3 | 0.3 | 0.3 | 0.3 |
| | 2. Polyisocyanate compound | | 9 | 9 | 9 | 9 | 9 |
| | 3. Thermoplastic elastomer | | 15 | 15 | 15 | 15 | 15 |
| | 4. Titanium oxide | | 3.5 | 3.5 | 3.5 | 3.5 | 3.5 |
| | 5. Polyethylene wax | | 1.5 | 1.5 | 1.5 | 1.5 | 1.5 |
| | 6. Ultraviolet absorber | | 0.2 | 0.2 | 0.2 | 0.2 | 0.2 |
| | 7. Hindered amine light stabilizer | | 0.1 | 0.1 | 0.1 | 0.1 | 0.1 |
| | 8. Thermal antioxidant | | 0.3 | 0.3 | 0.3 | 0.3 | 0.3 |
| Reclaimed material compounding ratio (weight ratio) | Virgin material | | 100 | 100 | 100 | 100 | 100 |
| | Reclaimed material | | 0 | 0 | 0 | 0 | 0 |
| Amount of reclaimed material included (wt %) | | | 0 | 0 | 0 | 0 | 0 |
| Results | Molding temperature (° C.) | | 220 | 225 | 230 | 235 | 240 |
| | Diameter (mm) | | 42.7 | 42.7 | 42.7 | 42.7 | 42.7 |
| | Weight (g) | | 45.5 | 45.5 | 45.5 | 45.5 | 45.5 |
| | Deflection (mm) | | 2.4 | 2.4 | 2.4 | 2.4 | 2.4 |
| | Yellowness index (YI) | | −19.5 | −19.2 | −18.9 | −18.6 | −17.7 |
| | Degree of yellowing (ΔYI) | | — | 0.3 | 0.6 | 0.9 | 1.8 |

*1: Amount of resin alone containing no thermal antioxidant.
*2: Total amount of thermal antioxidant included when synthesizing TPU-1 and TPU-2.

From the results in Table 9, it was apparent that production can be carried out without particular difficulty at molding temperatures of 220 to 240° C. However, at 240° C., a tendency for discoloration was confirmed.

Japanese Patent Application No. 2013-212786 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method of manufacturing golf balls having a core and a cover of at least one layer encasing the core, the method comprising the steps of, when molding the cover:
    synthesizing a cover stock base resin;
    blending and kneading an additive with the base resin to form a cover stock; and
    molding a cover using the kneaded cover stock,
    wherein a thermal antioxidant is included in both the base resin synthesizing step and the kneading step,
    wherein the amount of thermal antioxidant included in the synthesizing step is from 0.05 to 3.0 parts by weight per 100 parts by weight of the base resin, and the amount of thermal antioxidant included in the kneading step is from 0.05 to 3.0 parts by weight per 100 parts by weight of the base resin.

2. The method of claim 1, wherein the cover formed in the cover molding step is an outermost layer and the base resin is a thermoplastic polyurethane elastomer.

3. The method of claim 2, wherein the thermoplastic polyurethane elastomer is an aromatic polyisocyanate-containing thermoplastic polyurethane elastomer.

4. The method of claim 1, wherein injection molding is used in the cover molding step.

5. The method of claim 1, wherein the amount of thermal antioxidant included in the synthesizing step is from 0.1 to 1.0 part by weight per 100 parts by weight of the base resin, and the amount of thermal antioxidant included in the kneading step is from 0.1 to 1.0 part by weight per 100 parts by weight of the base resin.

6. The method of claim 1, wherein reclaimed material is included as some portion of the cover stock in the cover molding step, the amount of the reclaimed material included being set to from 20 to 50 wt % of the overall cover stock.

7. The method of claim 6, wherein the amount of the reclaimed material included is set to from 25 to 45 wt % of the overall cover stock.

8. The method of claim 1, wherein in the kneading step, an ultraviolet absorber is included in an amount of from 0.05 to 3.0 parts by weight, per 100 parts by weight of the base resin.

9. The method of claim 1, wherein in the kneading step, a light stabilizer is included in an amount of from 0.05 to 3.0 parts by weight, per 100 parts by weight of the base resin.

\* \* \* \* \*